Feb. 11, 1930.  R. W. HYDE  1,746,945
RECOVERING METALS
Filed May 21, 1927   2 Sheets-Sheet 1
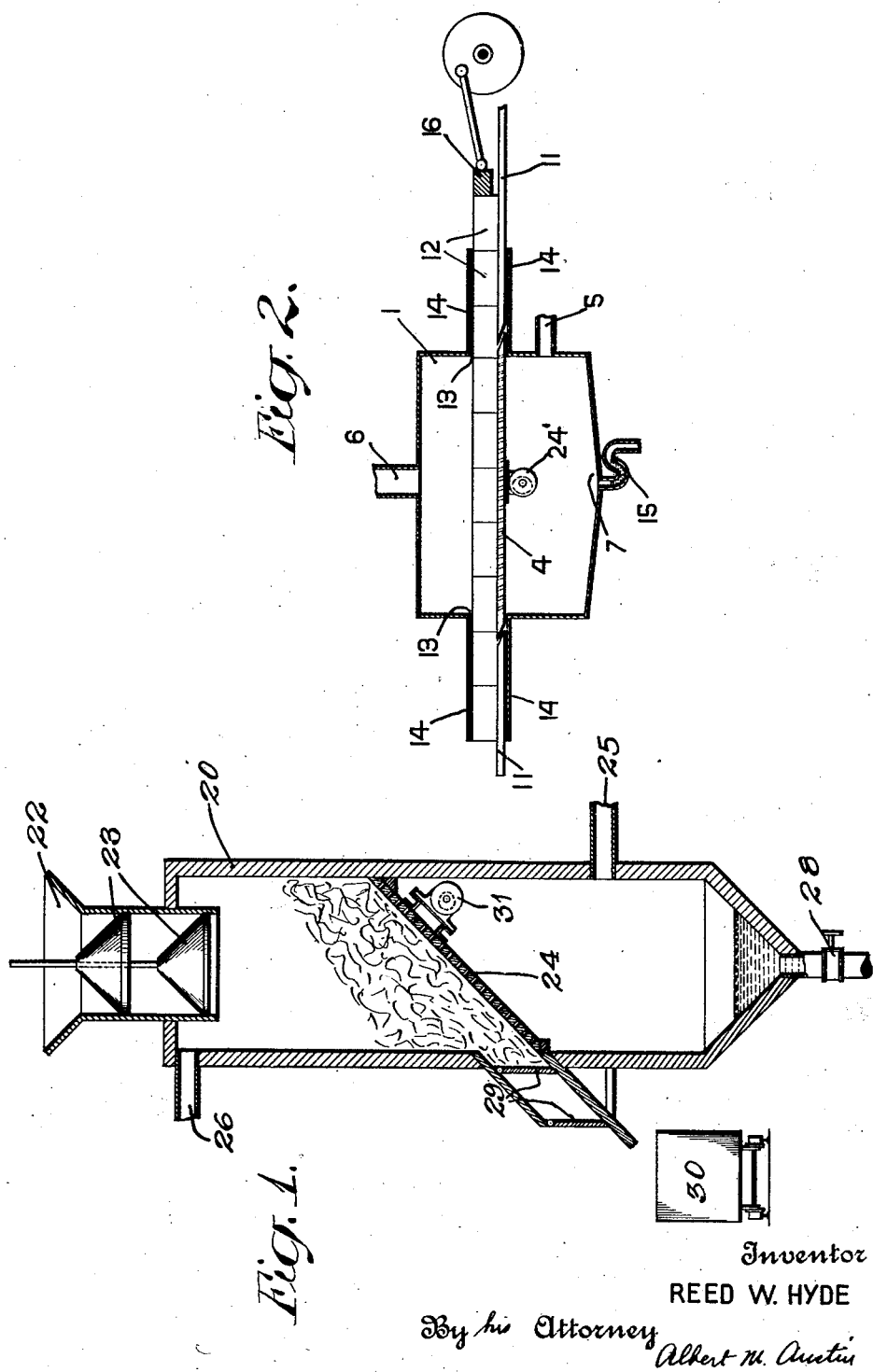
Inventor
REED W. HYDE
By his Attorney
Albert M. Austin

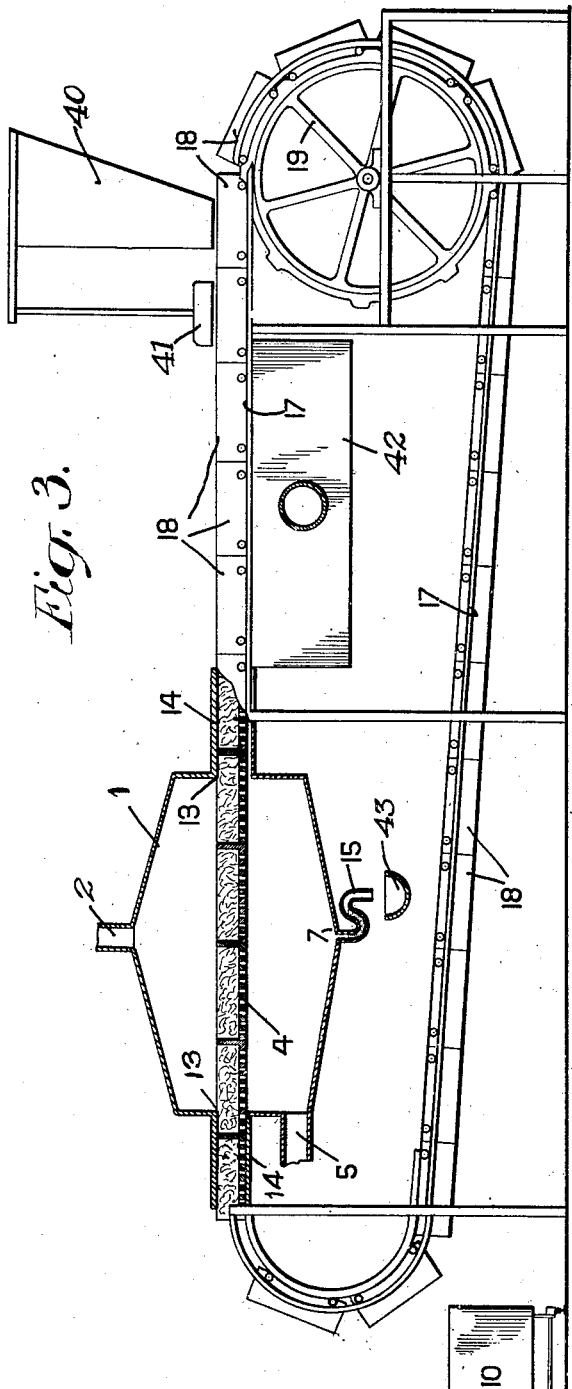

Patented Feb. 11, 1930

1,746,945

UNITED STATES PATENT OFFICE

REED W. HYDE, OF SUMMIT, NEW JERSEY, ASSIGNOR TO DWIGHT AND LLOYD METALLURGICAL COMPANY, OF NEW YORK, N. Y., A CORPORATION OF NEW JERSEY

RECOVERING METALS

Application filed May 21, 1927. Serial No. 193,133.

This invention relates to a method of recovering metals of low melting point from their ores or compounds, and further relates to a process of separating metals having different melting points from mixtures of the oxidized compounds of a plurality of metals having high and low melting points.

This invention provides for the treatment of materials containing oxidized compounds of metals having low melting temperatures such for example, as lead and antimony, whereby said metals may be separated from the gangue or other impurities which may be present without melting said gangue. The metals are reduced from oxidized forms at low temperatures prior to separation. The reduced metals of low melting point are then caused to melt and separate from the gangue and the reduced metals having a high melting point may then be treated directly for subsequent separation while in a heated condition. Materials containing sulphur, such as sulphide ores may first be sintered to remove the sulphur and oxidize the metals which may then be reduced to the metallic form for the subsequent separation of the various metals having high and low melting points.

The process in accordance with this invention consists in treating material containing oxidized forms of metals, such as lead and antimony, having comparatively low melting points, with a reducing agent at a temperature above the melting point of said metals but below the melting point of the gangue. Since reduction may take place at a lower temperature than that required for melting the gangue, the various metals present will be reduced into metallic form. Certain metals will then be melted and be separated from the remaining mass. The high melting point metals however, will remain in the solid metallic form with the gangue and may be separated therefrom or otherwise treated while in a pre-heated condition.

In the description, lead ores will be taken by way of illustration of materials for which this treatment is suitable, but other materials containing lead, as well as ores and materials containing other metals of low melting point may also be so treated. The reactions involved are in general exothermic, as indicated in the following example:

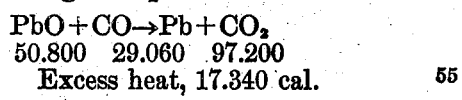
50.800   29.060   97.200
Excess heat, 17.340 cal.

Therefore it will generally be found that sufficient heat to maintain the required temperatures will be generated by the reactions. The temperature range for the operation is that between the melting point of the low melting point metal that is to be separated and the melting point of the gangue or other impurities or of the high melting point metals that may be present. For example, reduction of lead oxide begins at temperatures well below the melting point of lead, and is active at the melting point (327° C.), and lead is exceedingly fluid at temperatures little above its melting point. On the other hand, the usual gangue minerals in lead ores do not melt below 1000 to 1100° C. Consequently, there is a wide range in temperature in which the invention may be carried on, say from 327° C. to 1000°C. However, it is in general preferable to operate in the lower portion of the range, for reasons of economy in heat, and in wear and tear on the apparatus, and general ease of operation.

While in general sufficient heat is developed by the reactions to maintain the desired temperature, in some cases, for example in treating low grade ores, or where there is excessive heat loss by radiation, etc. it may be necessary to supply additional heat. This may be accomplished by various methods such for example, as preheating the charge or supplying heat in the reducing chamber by electrical means, by pre-heating the reducing gases or by alternately passing reducing gases and heating gases through the material under treatment.

With some materials, on the other hand, too much heat is generated. In these cases heat may be dissipated by increasing the radiation loss, or by other means. The charge may be diluted with heat absorbents, such as barren ore or limestone, or inert gases such as spent reducing gases may be mixed with the reducing gas for absorbing excess heat and slowing down the speed of reaction and consequently reducing the temperature.

It will be evident that metals of high melting point may be reduced during the treatment, completely or partially as desired, but will remain with the gangue. To recover these, the residue may be smelted or, if reduction is sufficiently complete, simply melted, to separate them from the slag, or may be given other suitable treatment as desired. Recovery of such metals is rendered materially easier by reason of the preliminary reduction, as well as because the residues containing them will have been heated.

The invention further consists in the new and novel features of operation and the new and original arrangements and combinations of steps in the process hereinafter described and more particularly set forth in the claims.

Although the novel features which are believed to be characteristic of this invention will be specifically pointed out in the claims appended hereto, the invention itself, as to its objects and advantages, the mode of its operation and the manner of its organization, may be better understood by referring to the following description taken in connection with the accompanying drawing forming a part thereof, in which like reference characters have been used to denote like parts in the various figures. Since such illustration is, however, primarily for purposes of disclosure, it will be understood that the structure and the method of operation thereof may be modified in various respects without departing from the broad spirit and scope of the invention.

One embodiment of the invention has been shown for purposes of illustration in the accompanying drawing, in which Fig. 1 is an elevation partly in section of one form of apparatus which may be employed when practicing this invention.

Fig. 2 is an elevation partly in section of a modified form thereof; and

Fig. 3 is an elevation showing the invention as applied to a sintering machine.

In the following description and in the claims the various parts of the apparatus and details of the invention will be identified by specific names for convenience, but they are intended to be as generic in their application as the art will permit.

Referring to the figures more in detail, and particularly to Fig. 1, 20 indicates a reduction chamber having the general form of a vertical walled chamber constructed of suitable material, the walls of which may be insulated, if desired, to reduce loss of heat. A charge hopper 22 is provided, from which the material to be treated, for example roasted lead ore, may be charged into the reducing chamber. Preferably any suitable device, such as the well known double bell charging apparatus indicated at 23, may be used to avoid escape of gases during the charging operation.

A sloping perforated support 24, for the ore having perforations through which the molten lead can drain, but not sufficiently large to permit the ore particles to drop through, is preferably inclined to a degree slightly more than the natural rolling slope of the material treated, and supports the ore in an approximately uniform bed. Gas inlet 25 and outlet 26 permit flow of gases, while metal well 27 serves to retain the molten metal until it is withdrawn through valved outlet 28. The spent charge is drawn out through double door 29 and discharged into bin or car 30. A vibrating mechanism 31 of any desired form may be attached to support 24 for assisting the operation of the device.

The operation, which may be continuous, is as follows: The material, e. g., roasted lead ore, is charged into the chamber 20 from hopper, 22, through the double bell, 23, and, falling onto the pile of previously charged material on the perforated support, 24, spreads out into a sufficiently uniform layer. Reducing gases are admitted to the chamber through the inlet 25, from a suitable source of supply, not shown, the flow being regulated by suitable valves, not shown, and pass upward through the bed of ore, reducing the oxidized metal compounds to the metallic state, the spent gases escaping through outlet 26.

The metallic lead immediately melts and percolates down through the charge and through the support 24 to collect in the well 27, from which it may be drawn off periodically into suitable receptacles. If desired, a siphon outlet may be used, to draw off the lead continuously. The shaking of support 24 aids in separating the lead from the gangue and prevents drops from accumulating on said support.

The spent charge is withdrawn through the double doors 29, acting similarly to double bell 23 to prevent gas leakage. Since it is not allowed to become molten, it still is in the form of loose pieces, as charged, though being lighter by reason of reduction and separation of the lead; and slides easily down the perforated support and out through the gates. Fresh charge, equivalent to the amount of spent material discharged, is then admitted and the reduction proceeds as before.

Obviously, the apparatus may be operated intermittently or continuously, as desired. In the latter case, only the completely reduced portion of the charge is withdrawn at one time, this being that portion nearest the support 24.

Instead of gaseous reducing agent, coal, coke, etc. may be used. In this case, the fuel may be mixed with the ore before charging, and if necessary, a limited amount of combustion supporting gas admitted to the chamber, 20, through inlet, 25, to burn part of the coal to carbon monoxide and raise the temperature to the necessary degree. The remaining coal, together with the carbon monoxide generated as above, reduces the metals, as before.

In Fig. 2 is shown diagrammatically and in section another form of apparatus in which this invention may be practiced. The reducing chamber, 1, comprises a relatively long, narrow and shallow chamber, which may be insulated, if desired. Extending on either end is a platform or trough 11, having side walls the height of the container cars 12. That portion of the platform 4, within the chamber 1, is perforated, corresponding with sloping support 24 of Fig. 1 and vibrating mechanism 24 is attached thereto. The platform preferably has about the same width as the interior of the chamber and is so constructed as to prevent leakage of gas around the sides. A series of perforate bottom containers or cars, 12, 12 transport the material to be treated along the platform and through the chamber 1, entering and leaving the chamber through ports 13, 13 in the ends; the cars making a close fit with sides of the ports. Dead plates 14, 14 are also provided to prevent leakage of gas from the ports by fitting closely to the tops and bottoms of the cars, and extending outwardly a distance greater than the length of one car. Gas inlet 5 and outlet 6 are provided as in Fig. 1 and also metal well 7, this being shown as ending in a siphon 15 through which the molten metal leaves the chamber without leakage of gas.

Suitable driving mechanism, indicated by the crank operated ram 16, propels the baskets or cars 12, along the platform 11. The operation is as follows:

A container 12, being filled with material, e. g., roasted lead ore, it is placed on the platform 11 at the end of the line of containers while the ram 16 is in its rearmost position. As the ram advances it pushes the line of containers forward a certain distance, equal to the length of one container, thus expelling from the chamber another container filled with heated charge. This is emptied, refilled and returned to the head of the line. The rate of travel through the reduction chamber is so regulated that the spent material is expelled through the exit port when the metallic components have been reduced and separated to the desired degree.

While each container is in the chamber 1, reducing gases from inlet 5 pass up through perforated support 4 and the perforated bottom of the container, through the roasted ore, reducing the lead to metal which immediately melts and flows through support 4 assisted by the vibratory motion thereof, to the metal well 7 and out through siphon 15. The residue, if containing values, may be subjected to any desired treatment.

It is obvious that the charge of material undergoing treatment should be permeable to gases and of such character that the molten reduced metal can drain from it. If excessively fine material is to be treated it may first be agglomerated by well known methods such as sintering, which will convert it into a porous cellular cake. This preliminary sintering has also the advantage of desulphurizing a sulphide material, converting the metals to oxidized forms. An additional advantage is that the sinter cake may be caused to leave the sintering machine at a temperature sufficiently high, especially in the lower portions, to cause reduction to proceed rapidly.

In Fig. 3 is shown diagrammatically and partly in section apparatus on which the material to be treated may first be sintered and then immediately reduced and the metals separated; the operations being carried on continuously.

The apparatus consists of a suitable frame work supporting a pair of rails forming a track 17 which has an upper substantially horizontal section, a lower section and vertical curved sections joining these, the whole forming an endless track around which small cars or pallets, 18, comprising individual open top boxes or containers, may be caused to move by suitable driving mechanism, indicated at 19. Hopper 40, igniter 41 and suction box 42 connected to a suction device, not shown, are provided, as in the well known continuous sintering machine. Beyond the suction box is provided a reduction chamber 1, with gas inlet 5 and outlet 6, metal well 7 and siphon 15, and with dead plates 14 to prevent gas leakage.

The operation is as follows: The material to be treated, for example, sulphide lead ore, is charged into hopper 40. As pallets 18 are propelled along the upper horizontal section of track 17, each is filled with charge, which is levelled off by the front plate of the hopper. The charge in each pallet is ignited as it passes under the igniter 41, and roasted and sintered as it passes over suction box 42. The pallet then carries the sinter cake into reduction chamber 1 through port 13. Here reducing gas from a suitable controlled source (not shown) is caused to pass up through the cake, the spent gases passing out through outlet 6. (The direction of flow may be in the reverse direction, if desired.) Preferably the gas is admitted under a slight pressure and withdrawn under a slight vacuum, so that the pressure within the chamber at the ports 13 will be approximately atmospheric, thus decreasing the tendency toward leakage. Leakage also is prevented by dead plates 14, which extend a distance somewhat greater than the length of the individual pallets, and which make close contacts with the bottoms, sides and top edges of the pallets. The rate of flow of the gas should be so coordinated with its concentration and volume and with the speed of travel of the sinter cake, its weight and the proportion of metals to be reduced, that reduction reactions between the metals in the sinter and the gas will be as complete as may be desired.

The sinter cake as it enters the reduction chamber will retain considerable heat, particularly in its lower portions (it will frequently be red hot toward the bottom). Reduction will therefore commence at once and proceed rapidly up through the cake, the heat developed by the reactions raising the temperature of the cooler portions of the cake to the necessary degree.

The reduced lead immediately melts and flows down into metal well 7 and out through siphon 15 into a suitable receptacle, as indicated at trough 43.

The residue, comprising the gangue together with copper and other metals of high melting point, if present in the ore, remains unmelted and is carried out of the chamber and discharged into a suitable receptacle, such as car 10, as the pallets pass around the vertical curved track at the end of the machine. The pallets thereupon pass down the lower track and are again elevated to the starting point to repeat the cycle.

It is evident that the combined sintering and reduction treatment may be carried out intermittently on a modified form of the intermittent pan sintering apparatus. In this case, after a charge has been sintered, the pan is covered with a hood, corresponding to the upper part of reduction chamber 1 (Fig. 3) and reducing gas passed through the sinter cake to reduce the metals, the lead flowing down into the lower section of the pan to be removed by suitable means. After the reduction, the hood is removed and the residue discharged by tilting the pan.

By means of the above described process, lead and other low melting point metals may be separately and directly obtained from their oxides by a quick and simple treatment. On account of carrying on the process at a low temperature, the amount of fuel required is reduced to a minimum and the melting of gangue or other residue is eliminated. In cases where preliminary sintering is necessary in order to agglomerate the material, the heat remaining in the sinter cake may be utilized in the reduction process thereby avoiding the waste of heat involved in cooling the sinter cake and then using additional fuel to bring the material to an appropriate temperature for the reduction process. The reaction being exotheric is largely carried on without the addition of extra fuel other than that required for the reduction itself.

By providing a process in which the reduction may be carried on at a low temperature, the loss of metal as fume is reduced to a minimum, since fuming does not occur to any appreciable extent in a reducing atmosphere at the temperature employed. The treatment is rapid and does not require expensive apparatus or involve a high cost of operation. Since the high melting point metals are pre-reduced, the residue may be readily smelted for the recovery of such metals and if charged into the smelting furnace, while still hot, the fuel consumption is further reduced by eliminating the necessity of heating a cold mass to the melting temperature.

It has been found that lead recovered by the above mentioned process may be readily refined and the separation thereof from the residue is commercially complete.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

What is claimed is:

1. The process of treating materials containing low melting point metals in sulphide form which comprises spreading said materials in a uniformly permeable layer bringing the particles of said layer to a state of incipient fusion while passing currents of oxidizing gases therethrough to oxidize the metals and to agglomerate the particles, passing said agglomerates through a reducing atmosphere while maintaining the temperature above the melting point and reducing point of the said metals but below the melting point of the residue whereby the oxides are reduced to a metallic state and the low melting point metals are fused, and separating the metals from the solid residue while in a fused condition.

2. Process of treating material in the form of fine particles containing low melting point metals which consists in spreading said particles in a permeable layer, sintering said layer to oxidize the metal compounds and convert the fine particles to sinter, reducing said compounds while maintaining the temperature above the melting point of metals but below the melting point of the gangue whereby said oxidized compounds are reduced to metallic form and fused, allowing the fused metals to drain from the gangue and collecting said metals.

3. Process of treating materials in the form of fine particles containing low melting point metals which consists in spreading said particles in a permeable layer on a pervious support, sintering said layer to oxidize the metal compounds and convert the fine particles to sinter, passing reducing gases through said cake while maintaining the temperature above the melting point and reducing point of metals to be recovered but below the melting point of the gangue whereby said oxidized compounds are reduced to metallic form and fused, allowing the fused metals to drain from the gangue and collecting said metals.

4. Process of treating lead bearing ores in the form of fine particles which consists in spreading said particles in a permeable layer on a pervious support, sintering said layer to oxidize the lead compounds and convert the fine particles to sinter, passing reducing gases through said sinter cake while maintaining the temperature above the melting point of lead but below the melting point of the gangue whereby said oxidized compounds of lead are reduced to metallic lead and fused, allowing the fused metals to drain from the gangue and collecting said lead.

In testimony whereof I have hereunto set my hand.

REED W. HYDE.